（12) United States Patent
Hisaw

(10) Patent No.: US 11,439,134 B2
(45) Date of Patent: Sep. 13, 2022

(54) SHAKING IN-LINE SPINNER FISHING LURE

(71) Applicant: Danny Lee Hisaw, Valliant, OK (US)

(72) Inventor: Danny Lee Hisaw, Valliant, OK (US)

( * ) Notice: Subject to any disclaimer, the term of this patent is extended or adjusted under 35 U.S.C. 154(b) by 104 days.

(21) Appl. No.: 17/157,985

(22) Filed: Jan. 25, 2021

(65) Prior Publication Data

US 2021/0227816 A1 Jul. 29, 2021

Related U.S. Application Data

(60) Provisional application No. 62/965,648, filed on Jan. 24, 2020.

(51) Int. Cl.
*A01K 85/10* (2006.01)
*A01K 85/14* (2006.01)

(52) U.S. Cl.
CPC .............. *A01K 85/10* (2013.01); *A01K 85/14* (2013.01)

(58) Field of Classification Search
CPC ...... A01K 85/10; A01K 85/14; A01K 85/147; A01K 85/1833; A01K 85/1837; A01K 85/1887; A01K 85/1891; A01K 85/00
USPC ........... 43/42.13, 42.11, 42.15, 42.16, 42.17, 42.18, 42.39, 43.15, 42.5, 42.52
See application file for complete search history.

(56) References Cited

U.S. PATENT DOCUMENTS

| | | | | |
|---|---|---|---|---|
| 4,718,191 A * | 1/1988 | Gentry | ................... | A01K 85/00 43/42.49 |
| 4,888,908 A * | 12/1989 | Morris | ................... | A01K 85/00 D22/129 |
| 5,058,309 A * | 10/1991 | Firmin | ................... | A01K 85/00 43/42.22 |
| 9,072,285 B1 * | 7/2015 | Rye | ........................ | A01K 85/00 |
| D864,348 S | 10/2019 | Hisaw | | |
| 10,834,909 B1 * | 11/2020 | Rye | ........................ | A01K 85/10 |
| 11,206,819 B1 * | 12/2021 | Rye | ........................ | A01K 95/00 |
| 2007/0199234 A1 * | 8/2007 | Davis | .................... | A01K 85/00 43/42.15 |
| 2008/0172924 A1 * | 7/2008 | Thorne | ................... | A01K 85/00 43/42.47 |
| 2013/0160347 A1 * | 6/2013 | Thome | ................... | A01K 85/00 43/42.39 |
| 2018/0310538 A1 * | 11/2018 | Supinski | ................. | A01K 85/01 |
| 2021/0227816 A1 * | 7/2021 | Hisaw | ................... | A01K 85/10 |

FOREIGN PATENT DOCUMENTS

WO WO-9824309 A1 * 6/1998 ............. A01K 85/00

* cited by examiner

*Primary Examiner* — Timothy D Collins
*Assistant Examiner* — Maria E Graber

(57) ABSTRACT

A shaking in-line spinner fishing lure has a hook, a wire shaft, a shaker blade, a spinner blade, and at least one loop fastener. The hook is connected to a first wire end of the wire shaft, and the shaker blade is rotatably coupled to a second end of the wire shaft through the at least one loop fastener, which may include a split ring and a duo snap lock, with the duo snap lock being rotatably coupled between the shaker blade and the snap lock, which is rotatably coupled to the wire shaft. The duo snap lock constrains a leading face of the shaker blade to be oriented toward the wire shaft, producing a vigorous shaking motion while in use. A spinner blade rotatably coupled to an end of the shaker blade produces an additional spinning motion for attracting fish to bite.

11 Claims, 3 Drawing Sheets

SHAKING IN-LINE SPINNER FISHING LURE

The current application claims a priority to the U.S. Provisional Patent application Ser. No. 62/965,648 filed on Jan. 24, 2020. The current application is filed on Jan. 25, 2021, whereas Jan. 24, 2021 was on a weekend.

FIELD OF THE INVENTION

The present invention relates generally to activity of fishing. More particularly, the present invention relates to fishing lures.

BACKGROUND OF THE INVENTION

Fishing lures traditionally have spinner blades to allow a fishing lure to shake erratically when a fishing lure is being dragged through water. The erratic shaking of the lures makes the lures look alive, allowing the lure to be more attractive for fish. Current fishing lures have the blades attached directly to the hook of a fishing lure. This setup does not optimize the amount of shaking a fishing lure can make. Therefore, there is a need for a setup that better optimizes the amount of shaking a fishing lure can make.

The present invention is a fishing lure that can create more shaking when dragged through water in comparison to traditional fishing lures. The present invention has the two blades rotatably connected to each other in a certain configuration to better optimize the amount of shaking the present invention can make.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is a fishing lure that is better optimized to perform a shaking action while in use. The configuration of the present invention allows for an increased amount of shaking in comparison to typical fishing lures.

Figure 1:
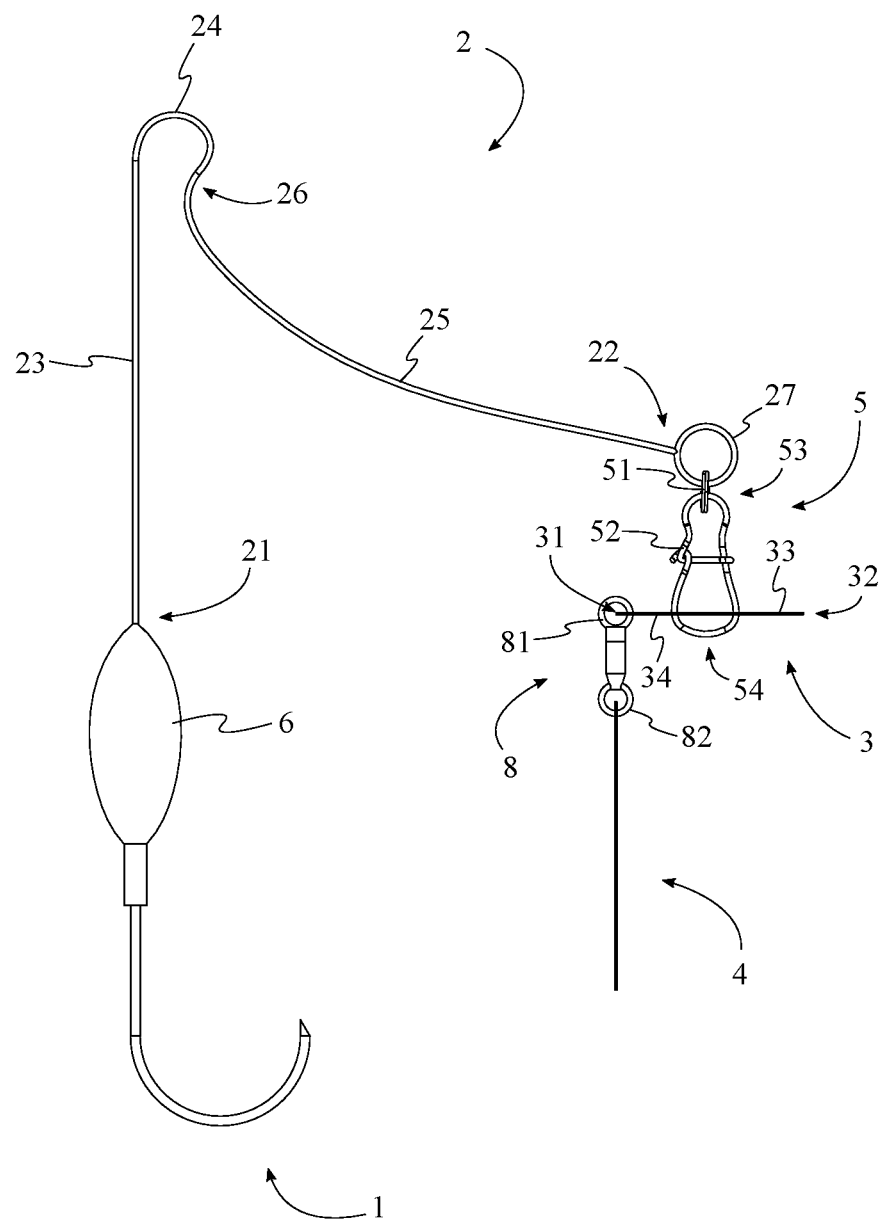
FIG. 1 is a side view of the present invention.
Figure 2:
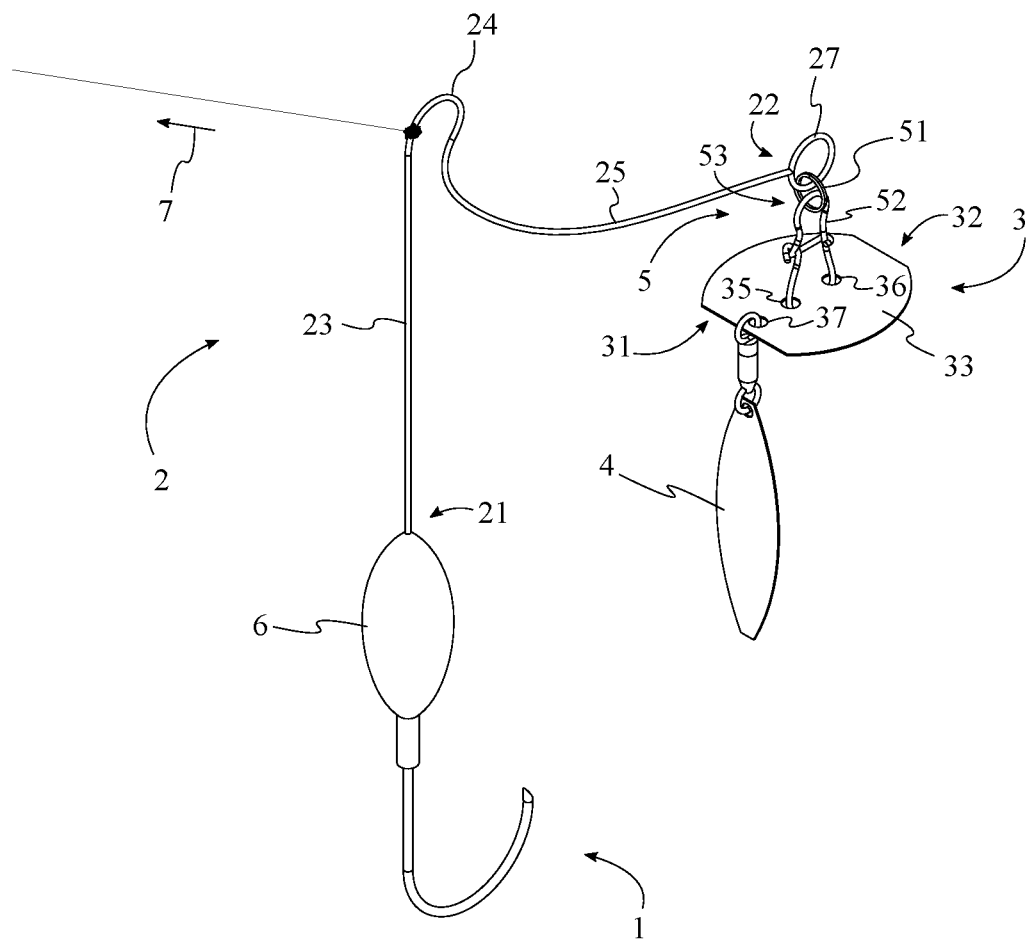
FIG. 2 is a perspective view of the present invention.

In general, Referring to FIGS. 1-2, the present invention comprises a hook 1, a wire shaft 2, a shaker blade 3, a spinner blade 4, and at least one loop fastener 5. The wire shaft 2 extends between a first wire end 21 and a second wire end 22, and the hook 1 is terminally connected adjacent to the first wire end 21. The construction of the wire shaft 2 may vary in different embodiments, but it may be noted that the wire shaft 2 preferably generally corresponds in material and dimension to currently existing wire shafts 2 in use with similar fishing lures.

In the preferred embodiment of the present invention, the shaker blade 3 is a generally flat, wafer-like object. The specific shape of the shaker blade 3 may vary in different embodiments. In the preferred embodiment, however, the shaker blade 3 resembles a rectangle with rounded lateral edges, or an ellipse with longitudinally opposing and parallel portions cut away, such that the portions of hypothetically removed area traverse longitudinally inward from the ellipse's vertices toward its center, wherein a longitudinal direction of the shaker blade 3 would correspond to the major axis of the hypothetical ellipse. The shaker blade 3 extends longitudinally between a first shaker end 31 and a second shaker end 32, wherein the first shaker end 31 and the second shaker end 32 would correspond to the edges of the aforementioned hypothetical cuts.

The at least one loop fastener 5 may be understood to be a generalized group of items which may comprise as few as one loop fastener, two loop fasteners, or more than two loop fasteners in various embodiments of the present invention in different configurations as desired. In various embodiments, each of the at least one loop fastener 5 may be connected or attached to each other in series, or the constituent items of the at least one loop fastener 5 may be connected or attached to each other in any other desired configuration. It may be understood that each of the at least one loop fastener 5 comprises at least one loop of material configured to securely retain another loop fastener within the loop. Such a loop may correspond in various embodiments to, for example, an open hook, a closed circle, or other appropriate shapes. In the preferred embodiment of the present invention, the at least one loop fastener 5 comprises a split ring 51 and a duo lock snap 52, each of which is a connector element well known in the art.

The at least one loop fastener 5 is rotatably coupled to the second wire end 22, such that the hook 1 and the at least one loop fastener 5 are positioned opposite each other along the wire shaft 2. The shaker blade 3 is rotatably coupled to the at least one loop fastener 5 between the first shaker end 31 and the second shaker end 32, such that the shaker blade 3 is positioned opposite the second wire end 22 along the at least one loop fastener 5. Thus, the shaker blade 3 is rotatably coupled to the second wire end 22 of the wire shaft 2 through the at least one loop fastener 5.

More particularly, in the preferred embodiment of the present invention, the shaker blade 3 comprises a leading face 33, a trailing face 34, a first aperture 35, and a second aperture 36. The leading face 33 and the trailing face 34 are positioned opposite each other on the shaker blade 3. The first aperture 35 and the second aperture 36 each traverse through the leading face 33 and the trailing face 34 between the first shaker end 31 and the second shaker end 32. More particularly, the first aperture 35 is positioned between the first shaker end 31 and the second aperture 36, and the second aperture 36 is positioned between the first aperture 35 and the second shaker end 32. The at least one loop fastener 5 is rotatably coupled to the first aperture 35, the second aperture 36, and the second wire end 22 of the wire shaft 2, wherein the shaker blade 3 is rotatably coupled to the second wire end 22 of the wire shaft 2 through the at least one loop fastener 5. Moreover, the leading face 33 is oriented generally toward the wire shaft 2 through the at least one loop fastener 5.

In the preferred embodiment, the first aperture 35 and the second aperture 36 are each elliptical in shape, with their major axes aligned with the aforementioned major axis of the shaker blade 3. However, the specific shape of the first aperture 35 and the second aperture 36 may vary as desired in different embodiments.

In the preferred embodiment, the wire shaft 2 further comprises a first shaft portion 23, a bend portion 24, and a second shaft portion 25. The first shaft portion 23 is substantially straight and traverses between the first wire end 21 and the bend portion 24, while the second shaft portion 25 traverses between the bend portion 24 and the second wire end 22, wherein the first shaft portion 23, the bend portion 24, and the second shaft portion 25 form an R-bend in the wire shaft 2. The R-bend is a typical double-arm eye configuration known in the art that bears a resemblance in shape to the capital letter R, where the first shaft portion 23 corresponds to the stem of the capital letter R, the bend corresponds to the bowl of the capital letter R, and the second shaft portion 25 corresponds to the leg of the capital letter R.

Figure 3:
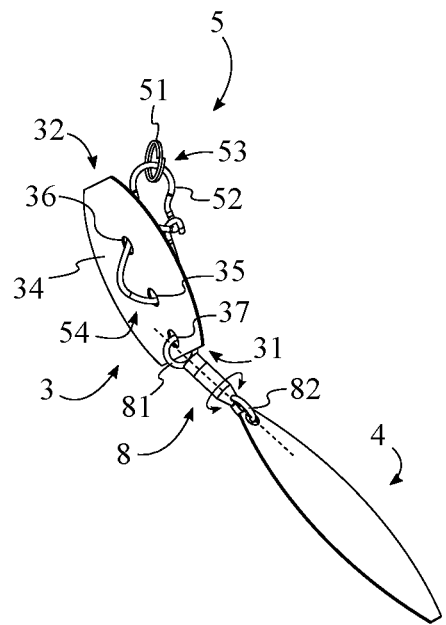
FIG. 3 is a rear perspective view of the shaking assembly of the present invention.

When in use, a user will attach the end of a fishing line to the bend. The bend is more specifically a generally annular arc segment radially traversing more than 270 degrees from tangent with the first shaft portion 23, curving away from and then back toward the first shaft portion 23 in order to form an entrance to the interior of the bend oriented toward the hook 1 that is smaller than the bend's diameter. An inflection point 26 reverses the rotational direction of the wire shaft 2 after the bend, directing the second shaft portion 25 to curve away from the first shaft portion 23 and forming the leg of the capital letter R. The at least one loop fastener 5, the shaker blade 3, and the spinner blade 4 are coupled in that order from the second wire end 22 of the wire shaft 2, and may considered to be a shaking assembly or agitation assembly of the present invention, as shown in FIG. 3.

In alternative embodiments of the present invention, any other desirable configuration of the wire shaft 2 may be implemented, such as, but not limited to, other double-arm eye configurations such as a U-bend, twisted eye, or safety-pin coil, as desired and applicable, or single-arm eye configurations such as wrapped-eye, open-eye, or safety-lock configurations, or any other desired configuration.

The preferred embodiment of the present invention further comprises a weighted body 6. The weighted body 6 is connected between the first shaft end and the hook 1. In the preferred embodiment, the weighted body 6 is constructed of lead, though the specific material of the weighted body 6 may vary in different embodiments. More particularly, in some embodiments, the wire shaft 2 and the hook 1 are affixed together through a lead molding process which forms the weighted body 6 around a terminal union of the wire shaft 2 and the hook 1. The ends of the wire shaft 2 and the hook 1 may be joined together prior to the lead molding process through any suitable means, such as, but not limited to, an eye on the end of the hook 1, through which a bend in the end of the wire shaft 2 is positioned, coupling the said ends together in the center of the mold.

It is considered to be generally desirable to add a certain amount of weight to the present invention in order to allow the present invention to sink to a desired depth beneath the water's surface during use. Furthermore, the weighted body 6 may additionally be aesthetically formed to mimic a fish head in appearance in order to present an optimally appealing target to a potential catch.

In the preferred embodiment, the wire shaft 2 further comprises an attachment loop 27. The attachment loop 27 is connected adjacent to the second wire end 22 of the wire shaft 2. In various embodiments, the specific nature of the attachment loop 27 may vary. For example, in some embodiments, the attachment loop 27 may be formed by creating an open bend in the wire at the second shaft end. The at least one loop fastener 5, therefore, being rotatably coupled between the shaker blade 3 and the second shaft end of the wire shaft 2, is more particularly rotatably coupled between the shaker blade 3 and the attachment loop 27, wherein the shaker blade 3 is rotatably coupled to the second wire end 22 through the attachment loop 27 in the preferred embodiment.

As previously mentioned, the at least one loop fastener 5 may comprise any desired type and number of loop fastener, alone or in combination, that enables the rotatable coupling between the shaker blade 3 and the wire shaft 2. In some embodiments, the at least one loop fastener 5 may comprise one or more simple loops of material that intersect through each other and are thus constrained within each other's perimetrical boundaries. It should be understood herein that the use of "rotatable coupling" between any given components should be understood to include this type of looped coupling, but should not be limited thereto, and alternative configurations may be implemented in the present invention through any other suitable geometry, fasteners, or joints which constrain the relevant components together in a similar fashion.

In general, to simplify, unless otherwise specified, any given pair of rotatably coupled components should be capable of, at minimum, two degrees of rotational freedom (specifically, pitch and yaw) at a shared point between the components, similar to a ball and socket joint. Due to the geometrical nature of intersected loop fasteners such as rings, additional degrees of freedom or semi-freedom may practically include perimetrical traversal along the boundary of a loop fastener and linear translation in all three dimensions, albeit constrained by the shared boundaries of the coupled loop fasteners.

As such, in general, the various movable components are loosely constrained to each other, generally positioned end to end, and are generally free to shake and spin within certain constraints dictated by their more specific coupling configurations. The shaker blade 3, however, as opposed to a single point of constraint, has two points of constraint to the at least one loop fastener 5—the first aperture 35 and the second aperture 36—and which are positioned more centrally on the shaker blade 3, as opposed to at one of its ends. As a result, one planar side of the shaker blade 3, the leading face 33, is constrained to generally face toward the wire shaft 2, or more particularly, toward the bend portion 24 of the wire shaft 2.

Since the present invention is intended to be pulled through the water by a fishing line affixed to the bend portion 24, the bend portion 24 is oriented toward the direction of travel 7 and is the leading edge of the present invention when being reeled in after a cast, as illustrated in FIG. 2. Thus, the leading face 33 of the shaker blade 3, being oriented to generally face the direction of travel 7 and thus presenting a relatively large cross-sectional area at any given time to the passing fluid, will experience relatively greater forces than the rest of the components of the present invention. The shaker blade 3 is additionally semi-constrained against free yaw rotation relative to the second shaft end of the wire shaft 2. As a result, the intensified forces incident on the shaker blade 3 resulting from the relative of flow of water past the present invention are converted predominantly into an oscillating back-and-forth, or shaking motion corresponding generally to the dual constraints of the first aperture 35 and the second aperture 36 along the boundary of one of the at least one loop fastener 5.

In the preferred embodiment of the present invention, the at least one loop fastener 5 comprises a split ring 51 and a duo lock snap 52, each of which are commonly known connecting elements in the art. The duo lock snap 52 extends between a first lock snap end 53 and a second lock snap end 54. The split ring 51 is rotatably coupled to the attachment loop 27 of the wire shaft 2. The first lock snap end 53 is rotatably coupled to the split ring 51, and the second lock snap end 54 is rotatably coupled to the shaker blade 3. More particularly, the wire boundary of the duo lock snap 52 is positioned through the first aperture 35 and the second aperture 36 of the shaper blade adjacent to the second lock snap end 54. Thus, the shaker blade 3 is rotatably constrained to the duo lock snap 52 at the second lock snap end 54, and is rotatably coupled to the split ring 51 through the duo lock snap 52. Moreover, the duo lock snap 52 is rotatably coupled to the attachment loop 27 of the wire shaft 2 through the split ring 51. Therefore, the shaker blade 3 is rotatably coupled to the attachment loop 27 through the duo lock snap 52 and the split ring 51 in a kinetic chain.

Finally, as previously mentioned, the spinner blade 4 is terminally and rotatably coupled to the first shaker end 31 of the shaker blade 3. As opposed to the dual point constraint configuration between the shaker blade 3 and the duo lock snap 52, the spinner blade 4 is rotatably constrained to the first shaker end 31 of the shaker blade 3 with, at minimum, two degrees of rotational freedom (pitch and yaw), similar to a ball and socket joint but not necessarily including the third degree of freedom, roll, that a typical ball and socket joint is configured with.

More particularly, in the preferred embodiment, a swivel 8 is further comprised. The swivel 8 is terminally and rotatably coupled to the first shaker end 31 of the shaker blade 3. More particularly, the swivel 8 has a first eye 81 and a second eye 82 which are terminally connected to opposing halves of the swivel 8, which are constrained to a single degree of freedom with each other; that is, axial rotation, such that the opposing halves of the swivel 8 are free to rotate independently about a shared axis, while being terminally constrained together, as illustrated in FIG. 3.

Moreover, in the preferred embodiment, the shaker blade 3 further comprises a third aperture 37. The third aperture 37 traverses through the leading face 33 and the trailing face 34 of the shaker blade 3 adjacent to the first shaker end 31, such that the first aperture 35 is positioned between the second aperture 36 and the third aperture 37.

The spinner blade 4 is terminally and rotatably coupled to the swivel 8, more particularly to the second eye 82 of the swivel 8, with at least two degrees of rotational freedom, opposite the shaker blade 3 along the swivel 8, wherein the spinner blade 4 is terminally and rotatably coupled to the first shaker end 31 of the shaker blade 3 through the swivel 8. The swivel 8 being present as a connector between the spinner blade 4 and the shaker blade 3 is considered a highly preferred arrangement, if not strictly mandatory in all embodiments. Without the swivel 8, the spinner blade 4 would be limited to, broadly speaking, two degrees of rotational freedom relative to the first shaker end 31 of the shaker blade 3, corresponding to freedom of yaw and pitch. The addition of the swivel 8 adds the third degree of freedom—roll, or axial rotation. Therefore, the spinner blade 4 has a full three degrees of rotational motion, and may freely yaw, pitch, or roll. However, the spinner blade 4 is primarily configured to spin, or roll, about the swivel 8 axis.

Thus, in view of the foregoing, the present invention provides a new in-line spinner fishing lure with enhanced motion properties. The shaker blade 3 is rotatably constrained against rolling and pitching motions with respect to the duo snap lock through the use of two points of constraint, which additionally constrains the leading face 33 of the shaker blade 3 to be generally oriented to present a wide cross-sectional area to any surrounding fluid flows. The increased amount of forces applied to the shaker blade 3 in its desired constrained configuration results in a vigorous back-and forth shaking motion while being reeled back in to a user after being cast into a body of water. The spinner blade 4 is a well-known feature in the art, but its inclusion in the present invention for its spinning attributes is synergistic together with the shaking attributes of the shaker blade 3, resulting in a combined motion pattern that is highly attractive to potential catches.

Although the invention has been explained in relation to its preferred embodiment, it is to be understood that many other possible modifications and variations can be made without departing from the spirit and scope of the invention as hereinafter claimed.

What is claimed is:

1. A shaking in-line spinner fishing lure comprising: a hook; a wire shaft; a shaker blade; a spinner blade; at least one loop fastener; the wire shaft extending between a first wire end and a second wire end; the hook being terminally connected adjacent to the first wire end; the shaker blade extending between a first shaker end and a second shaker end; the at least one loop fastener being rotatably coupled to the second wire end; the shaker blade being rotatably coupled to the at least one loop fastener between the first shaker end and the second shaker end, opposite the second wire end along the at least one loop fastener; and the spinner blade being directly, terminally, and rotatably coupled to the first shaker end of the shaker blade.

2. The shaking in-line spinner fishing lure as claimed in claim 1 comprising:
the wire shaft further comprising a first shaft portion, a bend portion, and a second shaft portion;
the first shaft portion traversing between the first wire end and the bend portion; and
the second shaft portion traversing between the bend portion and the second wire end, wherein the first shaft portion, the bend portion, and the second shaft portion form an R-bend in the wire shaft.

3. The shaking in-line spinner fishing lure as claimed in claim 1 comprising: the shaker blade further comprising a leading face, a trailing face, a first aperture, and a second aperture; the leading face and the trailing face being positioned opposite each other on the shaker blade; the first aperture and the second aperture each traversing through the leading face and the trailing face between the first shaker end and the second shaker end; the wire shaft further comprising an attachment loop; the attachment loop being connected adjacent to the second wire end of the wire shaft; and the at least one loop fastener being rotatably coupled to the attachment loop, the first aperture, and the second aperture.

4. The shaking in-line spinner fishing lure as claimed in claim 1 comprising:
   a weighted body; and
   the weighted body being connected between the first shaft end of the wire shaft and the hook.

5. The shaking in-line spinner fishing lure as claimed in claim 1 comprising:
   the shaker blade further comprising a first aperture, a second aperture, and a third aperture;
   the first aperture being positioned between the first shaker end and the second aperture;
   the second aperture being positioned between the first aperture and the second shaker end; and
   the third aperture traversing through a leading face and a trailing face of the shaker blade adjacent to the first shaker end, wherein the first aperture is positioned between the second aperture and the third aperture.

6. The shaking in-line spinner fishing lure as claimed in claim 1 comprising:
   a swivel;
   the swivel being terminally and rotatably coupled to the first shaker end of the shaker blade; and
   the spinner blade being terminally and rotatably coupled to the swivel, opposite the shaker blade along the swivel, wherein the spinner blade is terminally and rotatably coupled to the first shaker end of the shaker blade.

7. The shaking in-line spinner fishing lure as claimed in claim 1 comprising:
   the shaker blade further comprising a leading face, a trailing face, a first aperture, and a second aperture;
   the leading face and the trailing face being positioned opposite each other on the shaker blade;
   the first aperture and the second aperture each traversing through the leading face and the trailing face between the first shaker end and the second shaker end; and
   the at least one loop fastener being rotatably coupled to the second wire end of the wire shaft, the first aperture, and the second aperture, wherein the shaker blade is rotatably coupled to the second wire end of the wire shaft through the at least one loop fastener.

8. The shaking in-line spinner fishing lure as claimed in claim 7, wherein the first aperture and the second aperture are elliptical in shape.

9. The shaking in-line spinner fishing lure as claimed in claim 7, wherein the leading face is oriented toward the wire shaft through the at least one loop fastener.

10. The shaking in-line spinner fishing lure as claimed in claim 1 comprising:
    the at least one loop fastener comprising a split ring and a duo lock snap;
    the duo lock snap extending between a first lock snap end and a second lock snap end;
    the split ring being rotatably coupled to an attachment loop of the wire shaft;
    the first lock snap end being rotatably coupled to the split ring; and
    the second lock snap end being rotatably coupled to the shaker blade.

11. The shaking in-line spinner fishing lure as claimed in claim 10 comprising:
    the duo lock snap being positioned through a first aperture and a second aperture of the shaker blade adjacent to the second lock snap end.

* * * * *